Feb. 1, 1927.　　　　　　　　　　　　　　　　1,616,237
J. F. SEITZ
METHOD OF MAKING MOTION PICTURES
Filed May 25, 1922　　　5 Sheets-Sheet 1
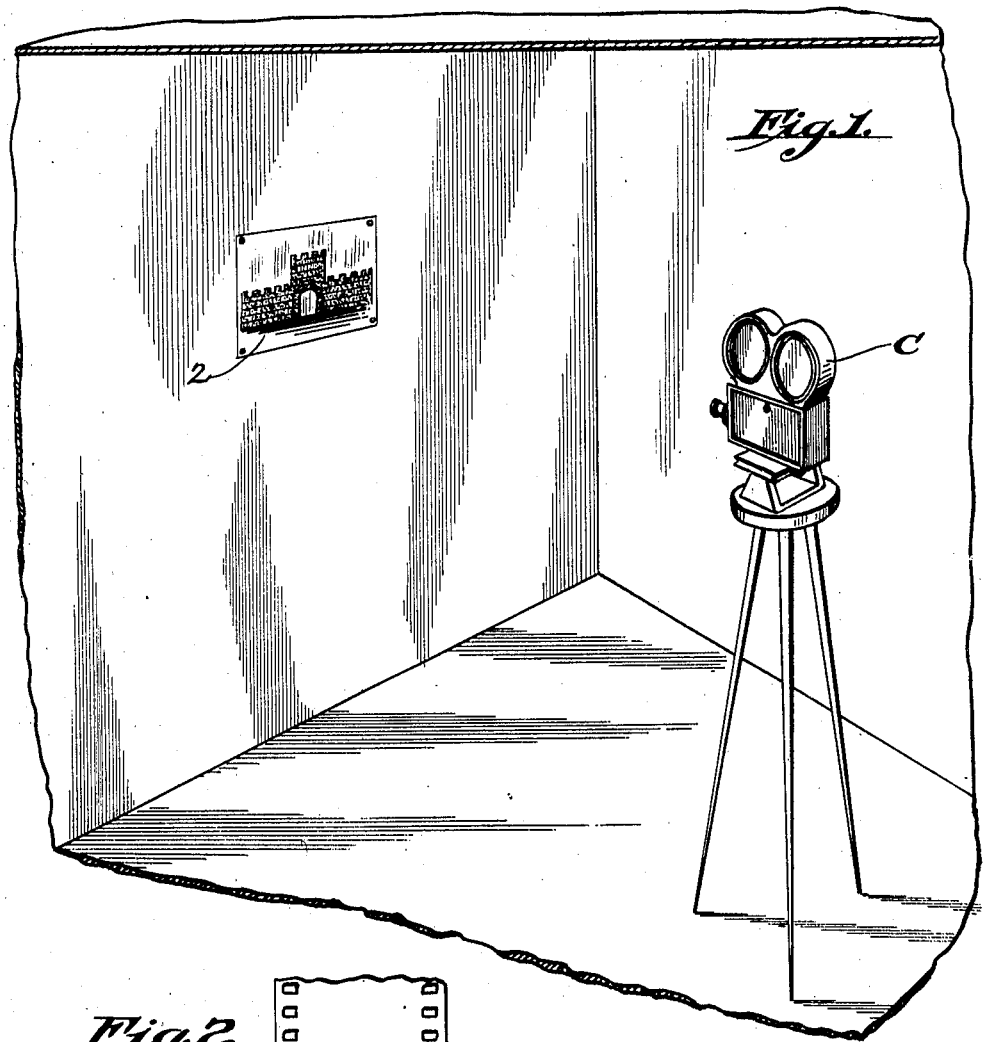
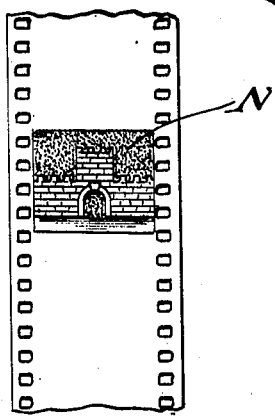
Inventor:
JOHN F. SEITZ.
By Hazard & Miller
Attorneys Feb. 1, 1927.
J. F. SEITZ
1,616,237
METHOD OF MAKING MOTION PICTURES
Filed May 25, 1922
5 Sheets-Sheet 2

Inventor:
John F. Seitz.
By Hazard & Miller
Attorneys.

Feb. 1, 1927.

J. F. SEITZ 1,616,237

METHOD OF MAKING MOTION PICTURES

Filed May 25, 1922    5 Sheets-Sheet 3

Inventor:
John F. Seitz.
By Hazard & Miller
Attorneys.

Feb. 1, 1927.
J. F. SEITZ
1,616,237
METHOD OF MAKING MOTION PICTURES
Filed May 25, 1922     5 Sheets-Sheet 4
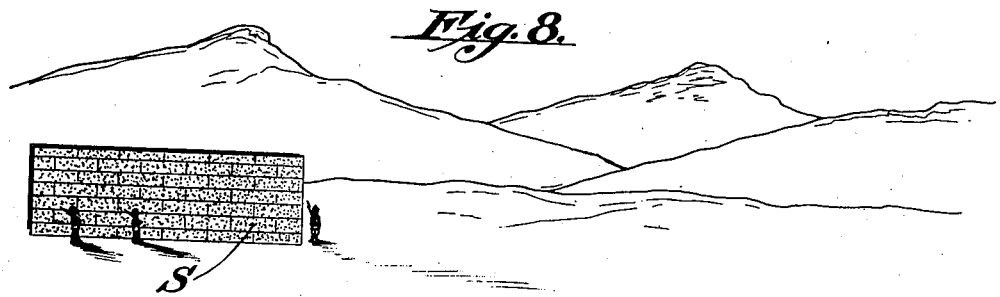
Fig. 8.
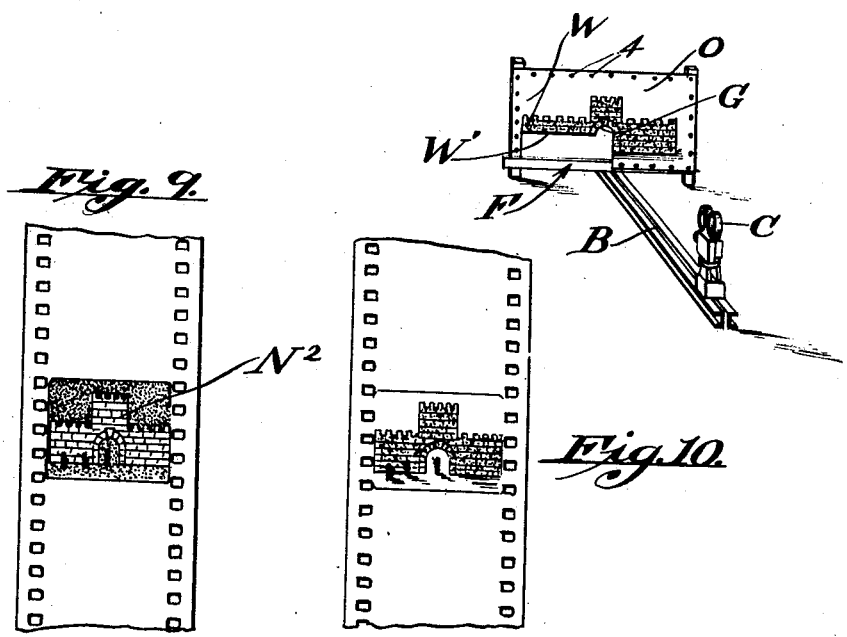
Fig. 9.
Fig. 10.
Inventor:
John F. Seitz.
By Hazard & Miller
Attorneys Feb. 1, 1927.  
J. F. SEITZ  
1,616,237  
METHOD OF MAKING MOTION PICTURES  
Filed May 25, 1922   5 Sheets-Sheet 5

Inventor:
John F. Seitz.
By Hazard & Miller
Attorneys

Patented Feb. 1, 1927.

1,616,237

UNITED STATES PATENT OFFICE.

JOHN F. SEITZ, OF HOLLYWOOD, CALIFORNIA.

METHOD OF MAKING MOTION PICTURES.

Application filed May 25, 1922. Serial No. 568,629.

This invention relates to the motion picture art, and especially pertains to a method for the making of motion picture films from which may be reproduced animated images.

It is an object of the present invention to provide a novel, practicable and effective method whereby backgrounds and also foregrounds of well known, or other scenes, can be incorporated in a motion picture production without reproductions, in full size, of the original subject or object, and without the presence thereof.

For instance, it may be desirable in producing a motion picture film to include in the field in the scene objects like the Washington Arch in New York, or some picturesque and celebrated institution, or a view of an old castle, or of an elegant mansion. Again, it may be desirable to include in a picture film images of very elaborate interior views not possible to set up in replica or substitution, except at very great expense which would be prohibitive in the production of the desired picture film. Likewise, many attractive natural landscapes can be utilized in the production of a picture, but the transportation of apparatus and company from place to place to obtain the desired views would be not only impractical but also prohibited by the cost.

Therefore, with the broad object in view of providing for the production of motion picture films having for scenes any of the above enumerated objects, fields and landscapes, I have devised a novel, simple and effective method for producing motion picture films including the desired object or objects in the field without making direct motion negatives of the original objects themselves.

Further, an object is to provide for the taking of a motion picture of any desired field including the image of a given object, and to provide for the "action" of players in such manner and manoeuvers as may be desired according to the picture to be produced.

To that end, my invention generically consists of obtaining a picture, of any size, of the original object, and preferably a photographic picture to preserve all of the true details, and then mounting this picture, or "copy", as it may be called, in the field of the lens of a motion picture camera and taking a negative in the camera from the said "copy". From this it will be seen that a film negative, of motion picture size, is produced from the picture of the desired original.

The claims in the present application are limited to the method of making a motion picture in which a photographic picture of a scene is made on a desired scale, a part thereof cut away and a set is constructed to simulate sufficient of the cut away part of the picture on a desired scale, which set is arranged behind the picture and an animated act in front of the set is photographed by means of a camera which is placed in such focus to the picture that the set and act and picture when photographed simulates an action in front of the ordinary scene with the actors appearing in proper proportion to such scene. The particular method of making a mat disclosed in the present application is claimed in my divisional continuation application for a method of making mats and apparatus therefor filed November 22, 1926, Serial Number 149,938.

The process will be more fully and completely described in the following specification and illustrated in the accompanying drawings, in which:

Fig. 1 is a perspective of a motion picture camera set to take a motion picture size negative of a primary picture or copy.

Fig. 2 is a view of the film negative produced from the first copy.

Fig. 8 is a perspective showing the utilization of an enlargement in combination with the motion picture camera and showing a "set" and "action" all arranged so that the negative taken by the motion picture camera will illustrate a complete scene including a picture of an original object forming an essential element in the field.

Fig. 9 is a view of a section of the negative produced by the step illustrated in Fig. 8.

Fig. 10 is a view of a section of a positive produced from the negative of Fig. 9.

In attempting to offer motion picture productions, it has been proposed to make hand produced so-called "scenes" as of exteriors of buildings and structures, and also hand produced scenes of interiors have been made. Again, replicas of scenes have been made. The first practice is unsatisfactory because of the imperfections of a reproduction, and the second practice is unsatisfactory because of the incident cost in making a replica. Principally, however, the disadvantages are that the true and perfect details of any given scene are conspicuously absent.

By my invention, all of the details of any scene desired are retained with a high degree of perfection and faithfulness, and this perfectness of reproduction I accomplish as will now be described.

Of any desired "scene", either interior or exterior, I obtain a first-class photographic picture, which, for the present purposes, may be referred to as the copy shown as 2 in Fig. 1, and which is here represented as an entrance gate or castle. This copy 2 is arranged to be photographed as by a motion picture camera C. It is immaterial as to the size of the copy 2 of the given subject, since it is obvious that the focusing of the motion picture camera will be determined according to the size of the copy. The camera, therefore, produces a negative such as is shown at N in Fig. 2. As many of the negatives N, as may be practical, may be produced by running a suitable length of film through the camera. The successive film sections, obviously, will be duplicate since the subject or copy 2 is inanimate.

Figure 5:
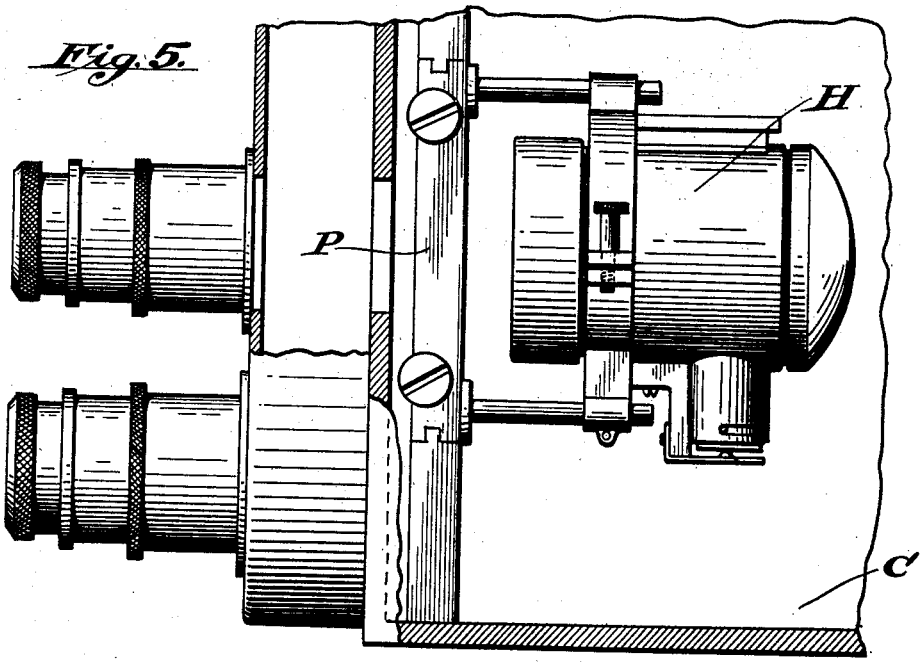
Fig. 5 is a detail view of a portion of a camera showing the lamp house and the associated and definitely positioned auxiliary plate arranged in the camera and positioned with respect to one of the lenses and ready for the production of an image.
Figure 3:
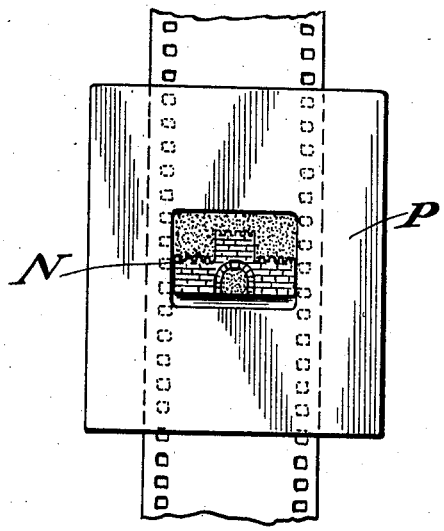
Fig. 3 is a detail showing the first negative arranged in the usual auxiliary aperture plate of a motion picture camera.
Figure 4:
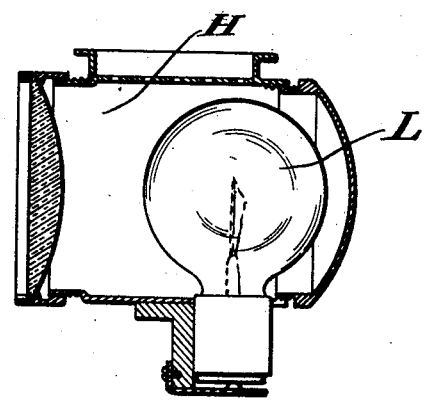
Fig. 4 is a longitudinal section showing a lamp house and lamp.

This photographic negative N is then introduced into an auxiliary aperture plate P, Fig. 3, and this is introduced into the same motion picture camera C by which the negative N was made of the copy 2. Within the camera there is also arranged in definite relation with the aperture plate P, a lamp house H having a suitable lamp or bulb L.

Figure 6:
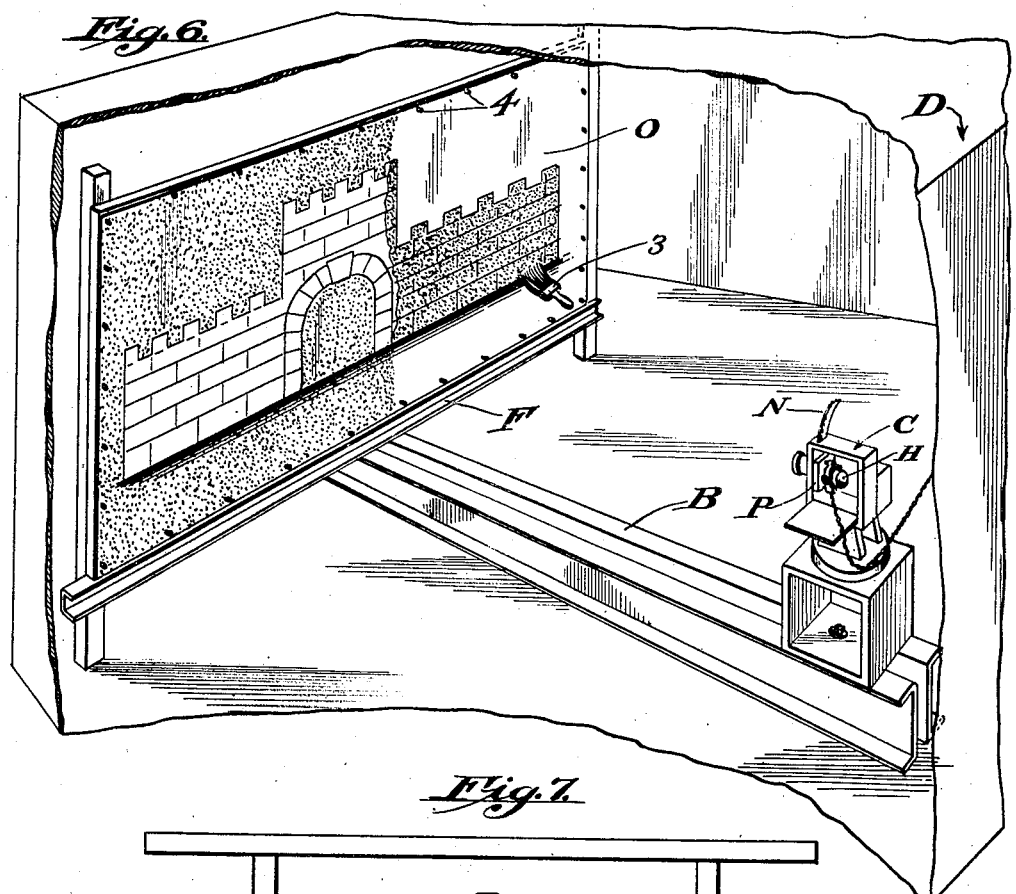
Fig. 6 is a view in perspective of the camera arranged in definite relation with respect to a frame and showing the production of an image by projection from the camera and also illustrating the step of "brush developing" the image on the developing paper, all in a dark room.
Figure 7:
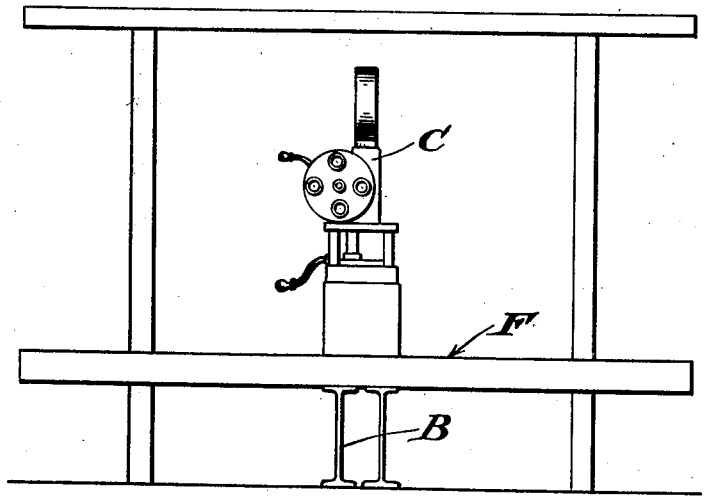
Fig. 7 is an end view looking through the frame and toward the projecting camera.

The camera C, dismounted from its tripod or other support utilized in the step shown in Fig. 1, is then applied in a solid or firm position to a rigid support shown as comprising, for example, a girder structure of iron beams B, Fig. 6, and at a suitable distance from the camera C there is fixed to the beam B a large or suitably proportioned frame F disposed vertically and transversely on the beam and being adapted to receive a sheet of photographic paper of suitable characteristics, onto which may be cast an image from the motion picture camera C from the negative N. This image is produced in a darkened space, as in a dark room D, and while so produced, a fixed picture or positive O is made of the image as by "brush developing" it as by the application of a suitable developer with a brush 3. Since it may be desirable to apply the enlarged picture O of the object back on the frame F after its removal, suitable registering means are provided and these may consist of a desirable number of suitably arranged registering pins 4 provided on the frame.

The fixed picture O of the object is a sharp and faithful enlargement of the copy 2 which has been produced photographically from the true original of and in any given scene. The dark room structure, if portable or knock down, may be removed leaving the beam, the camera C and the frame F all in the same relative fixed position as obtained when the enlargement or picture O was produced, or the paraphernalia, including the beam and its attached frame F and camera C, can be removed without relative change of its elements to any given location.

The next step in the method is to cut away the lower, or other suitable portion of the picture O, as will be determined according to the scene and subject. For instance, if the original of the copy 2 and indirectly of the enlargement O be the view of a ship at sea, or of a fortress, or of some other marine scene, then, if it is desired to reproduce a picture of the original object, the enlargement O may be fixedly mounted or otherwise over the body of water so that the natural wave action or current of the water can be utilized in making a motion picture scene.

For the present purpose, the scene includes, as a part, a view of a castle or city wall gate and when a scene is to be made including an animated action to be viewed as through the gate opening G, Fig. 8 the enlargement O will have that portion of the sheet registering with the gate cut away, as clearly indicated in Fig. 8, so that a background or field may be viewed through the opening of the gate G.

To further carry out the illusion of action, in which human beings may take a part and be made to appear as moving between the inside of the wall W and the field beyond in the opening, the picture O is further cut away according to the part affected by the animated scene. Since the enlargement O will be placed within eight or ten feet of the motion picture camera C, it is obvious that it would be impossible to have human characters act in a location between the camera and the enlargement O. Therefore, in order to preserve the true proportions as between the characters and the details existing in the wall W, the animated part of the scene must occur at such a distance beyond the set up enlargement O as will bring the animated objects down into a proper proportion with respect to the scene in which they form a component part associated with the wall and gate in the present case.

To that end, in the background beyond the enlargement O there is properly aligned, in the present case, a set panel S finished to be a replica in all details of a portion of the wall W and which replica is the copy of a portion of the wall which is cut away as along the line W' of the enlargement O. The set S is proportioned and designed so that when erected at a predetermined distance behind the frame F carrying the enlargement O, the camera will produce an image in which the set S combines so perfectly with the gate and wall W as to appear as an integral part of the wall. If the set S be positioned far enough away, actors may then get into action in front of and in a vertical plane in which the set stands and the action will be reproduced in the camera as though it occurs in front of the wall W shown in the enlargement O, and a part of the action may be made to appear as though far beyond or near the gate G.

While the action is occurring, the motion picture camera C is operated and a picture negative diagrammatically illustrated at N² is produced.

From the above it will be seen that by this method it is possible to make motion pictures including scenes comprising exterior and interior views frequently not accessible to motion picture producers, and moreover which, if accessible, would be only at such expense and also inconvenience, if not actual danger, as to make it substantially impossible to obtain an acceptable reproduction.

Figure 11:
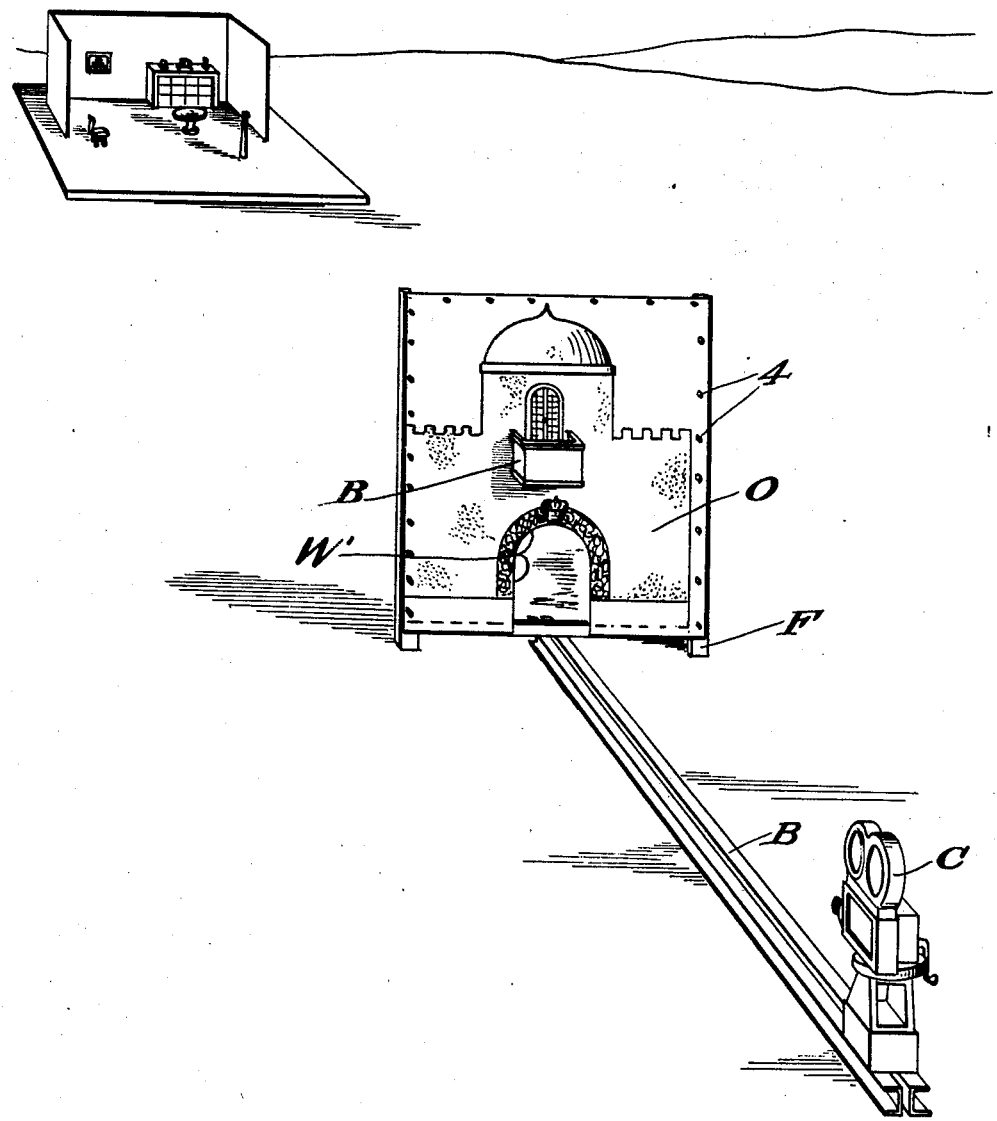
Fig. 11 is a view showing a step in the photographing of a scene in which the enlargement has a built-on feature to secure a consistent shadow.

Since the enlargement of the picture taken directly from the original object may show distinct shadows, it is desirable to provide means for the rectification of the shadows or principal shadows so as to render the same consistent with the shadows that will be produced by the action and objects in the background behind the set-up enlargement. For instance, if the shadows produced in the enlargement proper are not in co-ordination with the shadows produced in the background and in the action at the background, then the shadows in the enlargement must be made consistent, and this is accomplished in my invention by the erection or application, to the front of the enlargement, properly proportioned replicas, as for instance the balcony B shown in Fig. 11 which is built out in front of the enlargement so that the balcony will be consistent in its details with the size and with the characteristics of the original. Then when light, artificial or natural, is cast upon the set-up, the shadows of the projecting portion or portions on the front of the enlargement will be consistent with the shadows cast by the objects in the background and associated with the enlargement. By this step and apparatus it will be seen that a faithful reproduction in the minute details can be carried out.

Various modifications and changes may be resorted to within the spirit of the invention as claimed.

What is claimed is:

1. The method of making motion pictures which consists in utilizing a photographic picture of any size and making a photographic enlargement of the said picture, and building out portions of said enlargement so as to produce proper shadow effects in consonance with shadows of other objects in the combined scene to be finally photographed.

2. The step in the method of making a motion picture which consists in making a photographic picture of a given scene on a desired scale, cutting away part of the picture, constructing a set to simulate sufficient of the cut-away part of the picture on a desired scale, arranging the set behind the picture, producing an animated act in front of the set and behind the cut-away picture, and placing a camera in such focus to the picture, set and act that a photograph taken thereby simulates an action in front of the original scene, the actors appearing in proper proportion to such scene.

In testimony whereof I have signed my name to this specification.

JOHN F. SEITZ.